United States Patent
Lemauf et al.

(10) Patent No.: US 12,390,712 B2
(45) Date of Patent: Aug. 19, 2025

(54) COMPUTER SYSTEM FOR THE VIDEO SURVEILLANCE OF AT LEAST ONE STEP OF A GOLF COURSE

(71) Applicant: 18.EVENTS, Toulouse (FR)

(72) Inventors: Benoit Lemauf, Fontenilles (FR); Matthieu Baquier, Toulouse (FR); Jeremy Childes, Toulouse (FR)

(73) Assignee: 18.EVENTS, Toulouse (FR)

( * ) Notice: Subject to any disclaimer, the term of this patent is extended or adjusted under 35 U.S.C. 154(b) by 487 days.

(21) Appl. No.: 17/772,498

(22) PCT Filed: Oct. 28, 2019

(86) PCT No.: PCT/EP2019/079429
§ 371 (c)(1),
(2) Date: Apr. 27, 2022

(87) PCT Pub. No.: WO2021/083490
PCT Pub. Date: May 6, 2021

(65) Prior Publication Data
US 2023/0136449 A1      May 4, 2023

(51) Int. Cl.
*A63B 71/06* (2006.01)
*G06Q 20/32* (2012.01)
(Continued)

(52) U.S. Cl.
CPC ....... *A63B 71/0605* (2013.01); *G06Q 20/321* (2020.05); *G06Q 20/353* (2013.01); *G06T 7/20* (2013.01); *G06T 7/70* (2017.01); *G06V 20/42* (2022.01); *G06V 20/52* (2022.01); *H04N 5/772* (2013.01); *H04N 7/183* (2013.01); *A63B 2220/806* (2013.01); *A63B 2225/20* (2013.01); *A63B 2225/50* (2013.01); *G06T 2207/10016* (2013.01); *G06T 2207/20081* (2013.01); *G06T 2207/30224* (2013.01); *G06T 2207/30232* (2013.01); *G06T 2207/30241* (2013.01)

(58) Field of Classification Search
CPC .......... A63B 71/0605; A63B 2220/806; A63B 2225/20; A63B 2225/50
See application file for complete search history.

(56) References Cited

U.S. PATENT DOCUMENTS 5,102,140 A * 4/1992 Vincent .............. A63B 71/0605
  473/156
10,639,529 B1 * 5/2020 Luciano, Jr. ........... A63B 60/46
(Continued)

OTHER PUBLICATIONS

International Search Report dated Jul. 13, 2020.

*Primary Examiner* — Benjamin O Dulaney
(74) *Attorney, Agent, or Firm* — IPSILON USA, LLP

(57) ABSTRACT

The invention relates to a computer system and method for the video surveillance of at least one stage of a golf course (10) comprising at least one hole (40) and at least one tee (20). The video surveillance system (100) comprises video means (110), first electronic storage means (120), and data communication means (130), which are mounted on a support element (150). The video surveillance system (100) further comprises video processing means (140) for detecting the occurrence of a predetermined event involving a played golf ball, on the basis of a played-ball trajectory signal, of the position of the hole (40) and of the position of the tee (20).

12 Claims, 3 Drawing Sheets

(51) Int. Cl.

| | |
|---|---|
| *G06Q 20/34* | (2012.01) |
| *G06T 7/20* | (2017.01) |
| *G06T 7/70* | (2017.01) |
| *G06V 20/40* | (2022.01) |
| *G06V 20/52* | (2022.01) |
| *H04N 5/77* | (2006.01) |
| *H04N 7/18* | (2006.01) |

(56) References Cited

U.S. PATENT DOCUMENTS

| | | | |
|---|---|---|---|
| 2003/0004005 A1 | 1/2003 | Ainsworth | |
| 2003/0083138 A1* | 5/2003 | Nelson | A63B 24/0021 |
| | | | 348/E7.086 |
| 2005/0026710 A1 | 2/2005 | Pao | |
| 2005/0101415 A1 | 5/2005 | Sweeney | |
| 2008/0182685 A1* | 7/2008 | Marty | A63B 69/38 |
| | | | 473/407 |
| 2011/0230245 A1* | 9/2011 | Carr | A63B 24/0059 |
| | | | 463/7 |
| 2016/0337573 A1* | 11/2016 | Chan | H04N 23/63 |
| 2018/0021652 A1* | 1/2018 | Du Plessis | A63B 69/36 |
| | | | 473/155 |
| 2020/0391094 A1* | 12/2020 | Colangelo | A63B 69/3676 |
| 2021/0358161 A1* | 11/2021 | Caporizzo | G06T 3/40 |
| 2022/0134183 A1* | 5/2022 | Lee | A63B 24/0021 |
| | | | 473/199 |
| 2022/0366577 A1* | 11/2022 | Nagai | G06T 7/73 |

* cited by examiner

COMPUTER SYSTEM FOR THE VIDEO SURVEILLANCE OF AT LEAST ONE STEP OF A GOLF COURSE

RELATED APPLICATION

This application is a National Phase of PCT/EP2019/079429 filed on Oct. 28, 2019, the entirety of which is incorporated by reference.

TECHNICAL FIELD

The invention relates to a computer system and to a method for video surveillance of at least one step of a golf course.

PRIOR ART

Golf is a precision sport which is gaining increasing numbers of enthusiasts of all ages.

Equipped with clubs, golfers must hit a golf ball with a view to getting it into a golf hole. The aim of any player is to finish each golf hole in the fewest hits possible.

The golf hole is preceded by a teeing area, a fairway and a green. It is on the green that the golf hole to be reached is located.

One of the rarest golf shots is the hole-in-one, in which the ball ends up in the golf hole in a single shot from the teeing area.

To be verified and to qualify for a reward, the hole-in-one requires the presence of an official referee who checks, on the course, whether the conditions for validation of the shot have been met. This is why the hole-in-one is generally achieved in official golf competitions intended for professionals and semi-professionals.

There is therefore a need to make the possibility of playing a hole-in-one accessible outside official competitions without an official referee being required, while still allowing a reward to be obtained.

Document U.S. Pat. No. 5,102,140 describes a system in which a player interacts with a coin-operated machine before attempting a hole-in-one and potentially wins a reward in the event of success. The amount of the reward corresponds to the amounts input by previous players who failed to hit a hole-in-one.

In addition, this system allows the achievement of the hole-in-one to be recorded in the form of a video in order to allow a golf manager to verify the achievement of the hole-in-one.

Although this system allows a referee on the course to be omitted, it requires staff to view the video showing the achievement of the hole-in-one, and it takes time for the staff to find the correct moment in the video and to check that the conditions for validation of the shot have been met as an official referee would do.

SUMMARY OF THE INVENTION

The aim of the invention is to overcome this drawback.

Thus, the invention proposes a computer system and a method for video surveillance of at least one step of a golf course, which does not require an official arbiter or personnel to view the video showing the occurrence of the hole-in-one and validate the hole-in-one.

Thus, the invention provides a computer system for the video surveillance of at least one step of a golf course comprising at least one golf hole and at least one teeing area. The system comprises:

- video means for producing at least one video signal which represents at least one continuous image of at least the golf hole, the teeing area and all or part of the golf course step;
- first electronic storage means for recording the video signal;
- data communication means for transmitting the video signal to a computer network;
- wherein the video means, the first electronic storage means and the data communication means are mounted on a support element.

The system further comprises video processing means, connected to the computer network, for
- determining, based on the video signal, a relative position of the golf hole with respect to the support element,
- determining, based on the video signal, a relative position of the teeing area with respect to the support element,
- detecting, based on the video signal, at least one golf ball played on the golf course step,
- producing, based on the video signal, a trajectory signal which represents at least one trajectory of motion of the played golf ball, and
- detecting the occurrence of a predetermined event involving the played golf ball based on the trajectory signal, the position of the golf hole and the position of the teeing area.

In a first particular implementation, the video processing means are further provided to
- provide a plurality of simulated or dummy trajectory signals which each represent a trajectory of motion of a simulated or dummy golf ball that would have been played from the teeing area to the golf hole;
- compare the trajectory signal with all or some of the plurality of simulated or dummy trajectory signals; and
- detect the occurrence of the predetermined event involving the played golf ball based, in addition, on at least one result of the comparison.

In one example of the first particular implementation, the system further comprises a pre-trained machine learning system for predicting the plurality of simulated or dummy trajectory signals based on the video signal.

In a second particular implementation, the system further comprises means for creating a play limit which traces a minimum distance from a teeing position of the golf ball before it is played and/or at least one region projected on the ground which delimits a region of an arrival position of the golf ball after it has been played, the video processing means being further provided to detect the occurrence of the predetermined event involving the played golf ball based, in addition, on the video signal.

In a third particular implementation, a chassis bears the support element, the chassis being mounted on wheels which allow the support element to be moved over the ground and which are lockable on the ground.

In a fourth particular implementation, the support element is provided with means for moving a portion thereof so as to extend or retract the support element with respect to the chassis or to the ground.

In a fifth particular implementation, the system further comprises electrical connection means provided so as to supply at least the video means, the first electronic storage means and the data communication means with power when the electrical connection means are connected an external electrical power source.

In a sixth particular implementation, the system further comprises electrical power supply means provided so as to supply at least the video means, the first electronic storage means and the data communication means with power, the electrical power supply means comprising a battery.

In a seventh particular implementation, the system further comprises an electronic payment terminal which is intended to be connected to the computer network and is provided to communicate with an electronic payment means so as to cause the video surveillance system to be operational for a predetermined time after the payment of a predetermined amount.

In a first example of the seventh particular implementation, the electronic payment means is a payment card.

In a second example of the seventh particular implementation, the electronic payment means is a smart wearable device equipped with technology and an application for payment.

The invention also covers a method for the video surveillance of a golf course comprising at least one golf hole and at least one teeing area. The method comprises:
  video means producing at least one video signal which represents at least one continuous image of at least the golf hole, the teeing area and all or part of the golf course step;
  first electronic storage means recording the video signal;
  data communication means transmitting the video signal to a computer network;
  mounting the video means, the first electronic storage means and the data communication means on a support element; and
  providing, in the computer network, video processing means,
  the video processing means determining a relative position of the golf hole with respect to the support element based on the video signal,
  the video processing means determining a relative position of the teeing area with respect to the support element based on the video signal,
  the video processing means detecting at least one golf ball played on the golf course step based on the video signal,
  the video processing means producing a trajectory signal which represents at least one trajectory of motion of the played golf ball based on the video signal, and
  the video processing means detecting the occurrence of a predetermined event involving the played golf ball based on the trajectory signal, the position of the golf hole and the position of the teeing area.

Other objects, features and advantages of the invention will become apparent from reading the following description, which makes reference to the appended figures which show preferred embodiments of the invention, and which is provided only by way of non-limiting examples.

The figures are not necessarily to scale, in particular in terms of thickness, for the sake of illustration.

DESCRIPTION OF EMBODIMENTS

Figure 1:
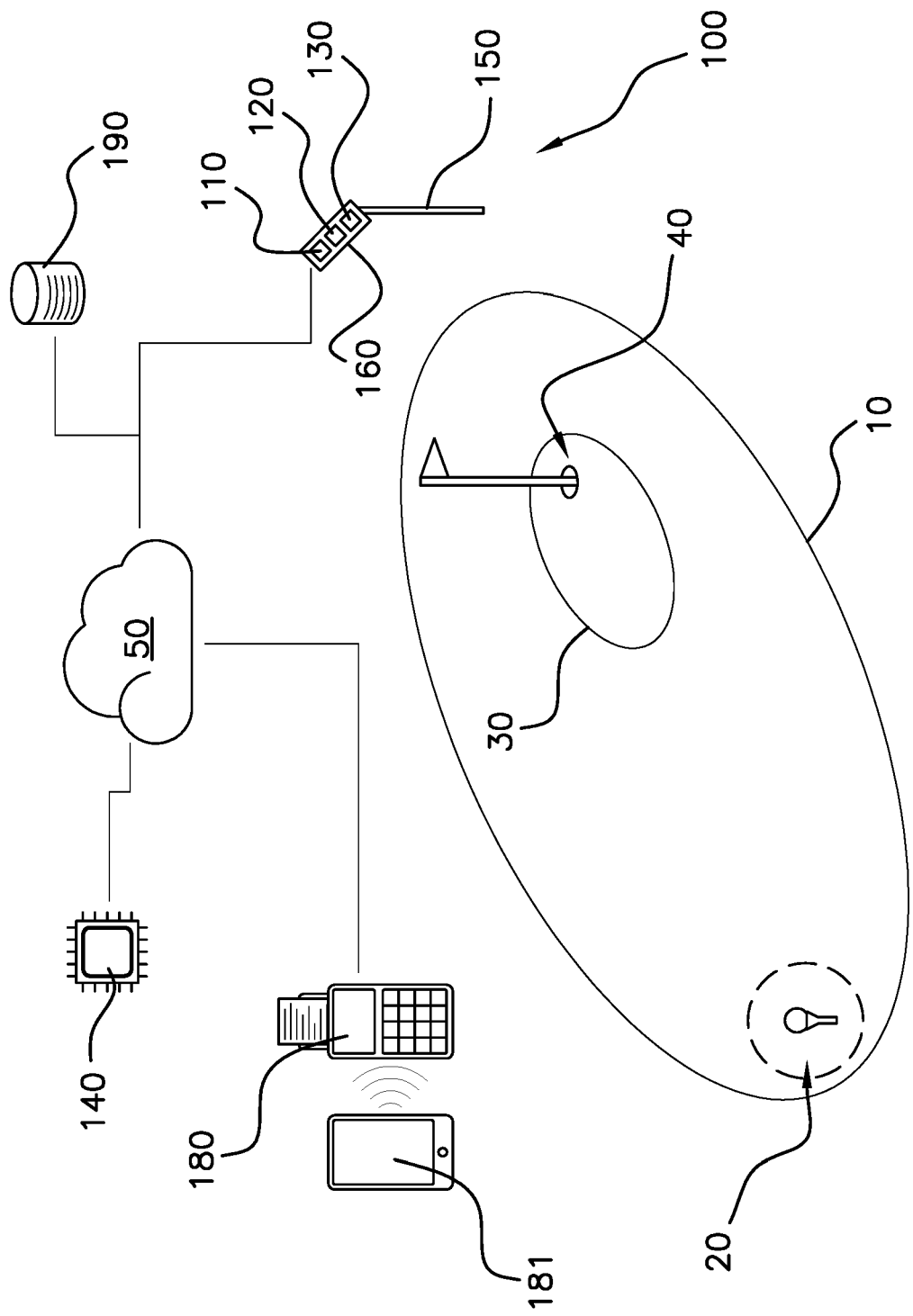
FIG. 1 shows a computer system for the video surveillance of at least one step of a golf course according to the invention.

As illustrated in FIG. 1, the video surveillance system 100 according to the invention is provided for the monitoring of a step 10 (also referred to as a "hole") of a golf course which comprises at least one teeing area 20 (also referred to as the "tee off") and at least one arrival area 30 which delimits at least one golf hole 40.

To recall, a golf course generally comprises eighteen different steps. However, the invention applies to other configurations of a golf course without requiring substantial modifications.

In FIG. 1, the video surveillance system 100 comprises:
  video means 110,
  first electronic storage means 120,
  data communication means 130, and
  video processing means 140.

In the example of FIG. 1, a computer network 50 is provided to interconnect the various elements of the video surveillance system 100.

In FIG. 1, the video means 110 are provided to produce at least one video signal which represents at least one continuous image of at least the golf hole 40, the teeing area 20 and all or part of the golf course step 10.

In one example, the video means 110 comprise at least one fixed video camera whose field of view is wide enough to cover the entire golf course step 10 and beyond. Additionally, it is possible to make provision for the fixed video camera to be equipped with a zoom and a filter for stabilizing the image.

In one particular implementation of this example, the video means 110 comprise at least two fixed video cameras, one of which is focused on the teeing area 20 and the other of which is focused on the golf hole 40.

In another particular implementation of this example, the video means 110 comprise at least three fixed video cameras, one of which is focused on the teeing area 20, another of which is focused on the golf hole 40 and the last of which covers the entire golf course step 10 and beyond.

In FIG. 1, the first electronic storage means 120 are provided to record the video signal.

In one example, the first electronic storage means 120 are known and of mass storage type (hard disks, SSD, optical disks, etc.) or of static memory type (Flash memories, PCRAM, FeRAM, etc.).

In one particular implementation, the first electronic storage means 120 are provided to associate the video signal with its location and a date. In this case, the video surveillance system 100 further comprises location means of GPS or Galileo type, and clock means of a known type.

In FIG. 1, the data communication means 130 are provided to transmit the video signal to the computer network 50.

In one example, the data communication means 130 are of wireless type and use at least one known wireless communication protocol of Wi-F1, 2G, 3G, 4G, 5G type.

In another example, the data communication means 130 are of wired type and use at least one known wired communication protocol of Ethernet type.

Still in FIG. 1, the video surveillance system 100 comprises a support element 150 on which the video means 110, the first electronic storage means 120 and the data communication means 130 are mounted.

In one example, the support element 150 is a support mast.

In another example, the support element 150 is a post.

In yet another example, the support element 150 is a wall.

In yet another example, the support element 150 is a natural element such as a tree.

In these examples, the support element 150 has a height of between 2 m and 3 m, preferably about 2.50 m.

In one particular implementation, the support element 150 is provided to be arranged behind the golf course step 10. However, the support element 150 may be arranged elsewhere around the golf course step 10, where it does not interfere with the player.

Figure 2:
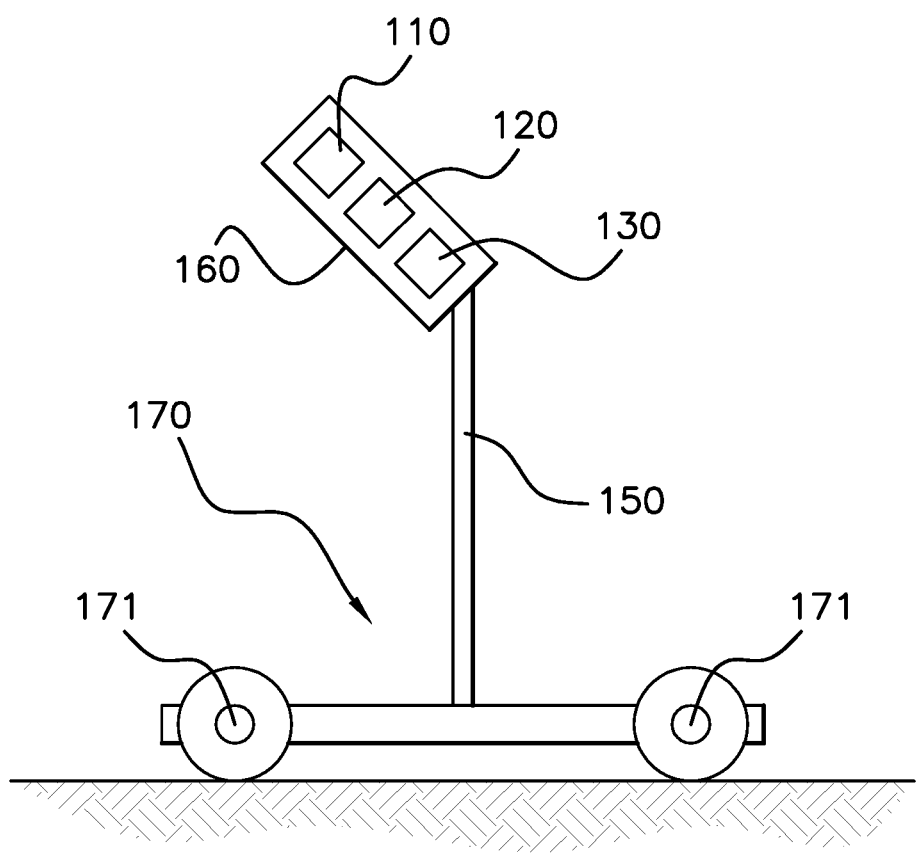
FIG. 2 shows one particular implementation of the support mast of FIG. 1.
Figure 3:
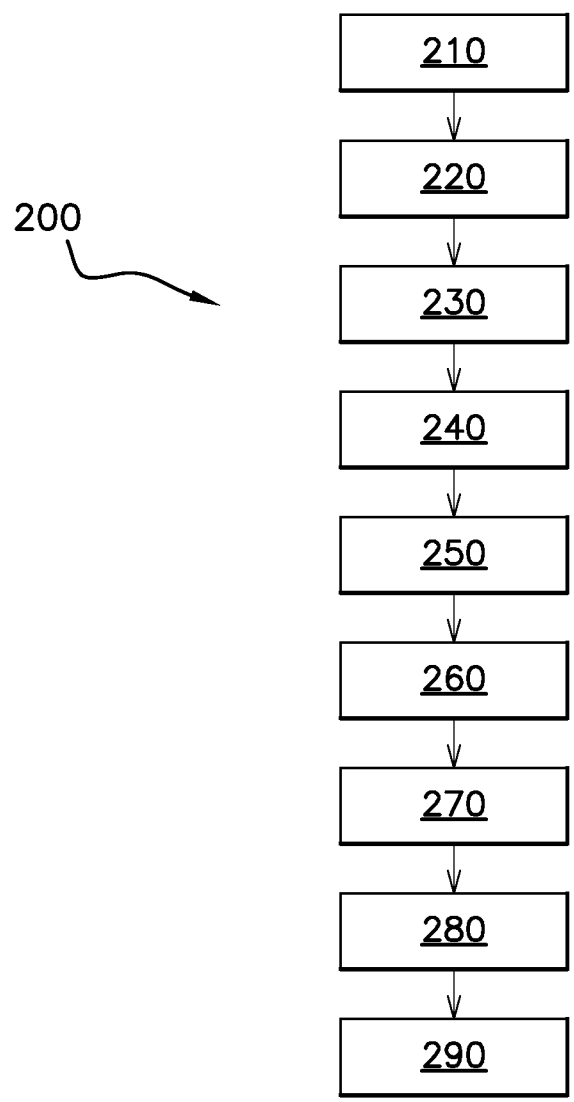
FIG. 3 shows a video surveillance method according to the invention.

In the example of FIGS. 1 and 2, a housing 160 surrounds the video means 110, the first electronic storage means 120 and the data communication means 130 when they are mounted on the support element 150.

In this way, the housing 160 protects the first electronic storage means 120 and the data communication means 130 from bad weather.

In one example, the housing 160 is removable so as to allow the means that it encloses to be replaced and/or repaired.

In one particular implementation, the housing 160 is provided with at least one opening (not shown) which is arranged to allow the passage of all or part of the optical system of the video means 110.

FIG. 2 illustrates one particular implementation of the support 150 when the support element 150 is a mast. In this particular implementation, a chassis 170 bears the support mast 150. In addition, the chassis 170 is mounted on wheels 171 which allow the support mast 150 to be moved over the ground.

In one particular implementation, the wheels 171 are lockable on the ground by means of locking means (not shown) of a known type.

In another particular implementation (not illustrated) of the support mast 150, the latter is provided with known means for moving a portion thereof so as to extend or retract the support mast 150 with respect to the chassis or to the ground.

In this way, the height of the optical system of the video means 110 may be adjusted so as to achieve the desired video acquisition.

Returning to FIG. 1, the video processing means 140 are first provided to determine, based on the video signal,
- a relative position of the golf hole 40 with respect to the support element 150, and
- a relative position of the teeing area 20 with respect to the support element 150.

In one particular implementation, a first spacing distance between the support element 150 and the optical system of the video means 110 is predetermined. In practice, the first predetermined spacing distance is of the order of a few centimeters and depends on the arrangement of the video means 110 on the support element 150.

Next, a second spacing distance between the optical system of the video means 110 and the ground is predetermined. In practice, the second predetermined spacing distance is of the order of a few tens of centimeters, preferably between 1.80 m and 2.20 m, and depends on the arrangement of the video means 110 on the support element 150.

Lastly, the video processing means 140 determine the relative position of the golf hole 40 and/or the relative position of the teeing area 20 by processing the video signal with the first and second predetermined spacing distance so as to estimate, for example by way of triangulation, a first distance measurement between the optical system of the video means 110 and the golf hole 40 and a second distance measurement between the optical system of the video means 110 and the teeing area 20.

In one example of this first particular implementation, the video processing means 140 estimate the first measurement between the support element 150 and the center of the golf hole 40.

In a second example of this particular implementation, the video processing means 140 estimate the first measurement between the support element 150 and a periphery of the golf hole 40.

In a third example of this particular implementation, the video processing means 140 estimate the second measurement between the support element 150 and the teeing area 20.

In a fourth example of this particular implementation, the video processing means 140 estimate the second measurement between the support element 150 and a periphery of the teeing area 20.

Still in FIG. 1, the video processing means 140 are then provided to detect, based on the video signal, at least one golf ball played on the golf course step 10.

In other words, the video processing means 140 may detect any golf ball that is played on the golf course step 10, regardless of whether or not the ball is played from the teeing area 20.

In this way, it will be possible to detect any error or any attempt to cheat by identifying any golf balls played from outside the area monitored by the video surveillance system 100.

Subsequently, the video processing means 140 are provided to produce, based on the video signal, a trajectory signal which represents at least one trajectory of motion of the played golf ball. For this, the video processing means 140 implement known methods for detecting moving objects in a video sequence.

In one example, the trajectory of motion of the played golf ball is chosen from the flight of the played golf ball through the air, the rolling of the played ball over the ground, and a combination of the two.

In one particular implementation, the video surveillance system 100 further comprises second electronic storage means 190 connected to the computer network 50 which are provided to record the trajectory signal.

In this way, the trajectory of motion of the played golf ball may be played back later on, locally or remotely, for example on known display means such as an electronic screen or transparent film, which might or might not be touch-sensitive.

Lastly, the video processing means 140 are provided to detect the occurrence of a predetermined event involving the played golf ball based on the trajectory signal, the position of the golf hole 40 and the position of the teeing area 20. For this, as mentioned above, the video processing means 140 implement known methods for detecting moving objects in a video sequence.

In one example, the predetermined event involving the played golf ball may be one of the following events:
- the played golf ball has entered/has not entered the golf hole 40,
- the golf ball has been played/has not been played from the teeing area 20 and has entered/has not entered the golf hole 40,
- the played golf ball has stopped at a predetermined distance from the golf hole 40.

In one particular implementation, the video processing means 140 are further provided to produce a plurality of simulated or dummy trajectory signals which each independently represent a trajectory of motion of a simulated or dummy golf ball that would have been played from the teeing area 20 to the golf hole 40.

In one example, the video processing means 140 calculate a predetermined number of possible trajectories of motion of a simulated or dummy golf ball. Preferably, the video processing means 140 take into account the relief of the terrain of at least the golf course step 10 and of its surroundings. It will be possible to use, for example, digital files modelling the relief of the terrain of at least the golf course step 10 and of the possible trajectories of motion of a simulated or dummy golf ball according to the relief of the terrain and any natural elements such as a tree or a mound.

In another example, the video processing means 140 further comprise a machine learning system (not shown) which is pre-trained to predict the plurality of simulated or dummy trajectory signals based on the video signal. For this, the machine learning system may be trained using training video signals which comprise images of actual trajectories of motion of a golf ball played on a plurality of golf course steps 10.

In this particular implementation, the video processing means 140 are further provided to compare the trajectory signal with all or some of the plurality of simulated or dummy trajectory signals.

Lastly, in this particular implementation, the video processing means 140 are further provided to detect the occurrence of the predetermined event involving the played golf ball based, in addition, on at least one result of the comparison.

In another particular implementation, the video surveillance system 100 further comprises means for creating a play limit which traces a minimum distance from a teeing position of the golf ball before it is played and/or at least one region projected on the ground which delimits a region of an arrival position of the golf ball after it has been played. In this case, the video processing means are further provided to detect the occurrence of the predetermined event involving the played golf ball based, in addition, on the video signal.

In one example, a visible light emitter (not shown) forms the means for creating a play limit. Preferably, the light emitted by the visible light emitter is a laser light which describes a light beam that traces at least one line projected on the ground which marks the minimum distance from a teeing position of the golf ball before it is played and/or the region projected on the ground which delimits a region of an arrival position of the golf ball after it has been played.

In yet another particular implementation, the video surveillance system 100 further comprises an electronic payment terminal 180 intended to be connected to the computer network 50 and provided to communicate with an electronic payment means 181 so as to cause the video surveillance system 100 to be operational for a predetermined time after the payment of a predetermined amount.

In one example of this yet another particular implementation, the electronic payment means 181 is a contactless or contact payment card.

In another example of this yet another particular implementation, the electronic payment means 181 is a smart wearable device with technology and an application for payment. In this example, the payment application is configured to activate payment in response to the smart wearable device interacting with an image, for example a bar code or QR code. In addition, the payment application may also be configured to activate payment in response to the establishment of a near or short-range communication, for example of NFC, RFID or Bluetooth type.

In yet another particular implementation, the video surveillance system 100 further comprises electrical connection means (not shown) provided so as to supply at least the video means 110, the first electronic storage means 120 and the data communication means 130 with power when the electrical connection means are connected to an external electrical power source.

In one example, the external electrical power source is a photovoltaic panel. In this way, the system is electrically autonomous.

In yet another particular implementation, the video surveillance system 100 further comprises electrical power supply means (not shown) provided so as to supply at least the video means 110, the first electronic storage means 120 and the data communication means 130 with power, the electrical power supply means comprising a battery.

The invention also covers a method 200 for the video surveillance of the golf course step 10.

Step 210 comprises, as explained above, the video means 110 producing at least one video signal which represents at least one continuous image of at least the golf hole 40, the teeing area 20 and all or part of the golf course step 10.

Step 220 comprises, as explained above, the first electronic storage means 120 recording the video signal.

Step 230 comprises, as explained above, the data communication means 130 transmitting the video signal to the computer network 50.

Step 240 comprises, as explained above, mounting the video means 110, the first electronic storage means 120 and the data communication means 130 on the support element 150.

Step 250 comprises, as explained above, providing, in the computer network 50, video processing means 140.

Step 260 comprises, as explained above, the video processing means 140 determining a relative position of the golf hole 40 with respect to the support element 150 based on the video signal. This step also comprises the video processing means 140 determining a relative position of the teeing area 20 with respect to the support element 150 based on the video signal.

Step 270 comprises, as explained above, the video processing means 140 detecting at least one golf ball played on the golf course step 10 based on the video signal.

Step 280 comprises, as explained above, the video processing means 140 producing a trajectory signal which represents at least one trajectory of motion of the played golf ball based on the video signal.

Lastly, step 290 comprises, as explained above, the video processing means 140 detecting the occurrence of a predetermined event involving the played golf ball based on the trajectory signal, the position of the golf hole 40 and the position of the teeing area 20.

The invention claimed is:

1. A computer system for the video surveillance of at least one step of a golf course having at least one golf hole and at least one teeing area, the system comprising:
    video means for producing at least one video signal which represents at least one continuous image of at least the golf hole, the teeing area and all or part of the golf course step;
    first electronic storage means for recording the video signal;
    data communication means for transmitting the video signal to a computer network;
    wherein the video means, the first electronic storage means and the data communication means are mounted on a support element,
the system further comprising:
    video processing means, connected to the computer network, for;

determining, based on the video signal, a relative position of the golf hole with respect to the support element, determining, based on the video signal, a relative position of the teeing area with respect to the support element, detecting, based on the video signal, at least one golf ball played on the golf course step, producing, based on the video signal, a trajectory signal which represents at least one trajectory of motion of the played golf ball, and detecting the occurrence of a predetermined event involving the played golf ball based on the trajectory signal, the position of the golf hole and the position of the teeing area.

2. The system as claimed in claim 1, wherein the video processing means are further configured to provide a plurality of simulated or dummy trajectory signals which each represent a trajectory of motion of a simulated or dummy golf ball that would have been played from the teeing area to the golf hole;

compare the trajectory signal with all or some of the plurality of simulated or dummy trajectory signals; and detect the occurrence of the predetermined event involving the played golf ball based, in addition, on at least one result of the comparison.

3. The system as claimed in claim 2, further comprising a pre-trained machine learning system for predicting the plurality of simulated or dummy trajectory signals based on the video signal.

4. The system as claimed in claim 1, further comprising means for creating a play limit which traces a minimum distance from a teeing position of the golf ball before it is played and/or at least one region projected on the ground which delimits a region of an arrival position of the golf ball after it has been played, the video processing means being further provided to detect the occurrence of the predetermined event involving the played golf ball based, in addition, on the video signal.

5. The system as claimed in claim 1, in which a chassis bears the support element, the chassis being mounted on wheels which allow the support element to be moved over the ground and which are lockable on the ground.

6. The video surveillance system as claimed in claim 1, wherein the support element is provided with means for moving a portion thereof so as to extend or retract the support element with respect to the chassis or to the ground.

7. The system as claimed in claim 1, further comprising electrical connection means provided so as to supply at least the video means, the first electronic storage means and the data communication means with power when the electrical connection means are connected to an external electrical power source.

8. The system as claimed in claim 1, further comprising electrical power supply means provided so as to supply at least the video means, the first electronic storage means and the data communication means with power, the electrical power supply means comprising a battery.

9. The system as claimed in claim 1, further comprising an electronic payment terminal which is intended to be connected to the computer network and is provided to communicate with an electronic payment means so as to cause the video surveillance system to be operational for a predetermined time after the payment of a predetermined amount.

10. The video surveillance system as claimed in claim 9, wherein the electronic payment means is a payment card.

11. The video surveillance system as claimed in claim 9, wherein the electronic payment means is a smart wearable device equipped with technology and an application for payment.

12. A method for the video surveillance of a golf course having at least one golf hole and at least one teeing area, the method comprising:

video means producing at least one video signal which represents at least one continuous image of at least the golf hole, the teeing area and all or part of the golf course step;

first electronic storage means recording the video signal;

data communication means transmitting the video signal to a computer network;

mounting the video means, the first electronic storage means and the data communication means on a support element; and providing, in the computer network, video processing means, the video processing means determining a relative position of the golf hole with respect to the support element based on the video signal, the video processing means determining a relative position of the teeing area with respect to the support element based on the video signal, the video processing means detecting at least one golf ball played on the golf course step based on the video signal, the video processing means producing a trajectory signal which represents at least one trajectory of motion of the played golf ball based on the video signal, and the video processing means detecting the occurrence of a predetermined event involving the played golf ball based on the trajectory signal, the position of the golf hole and the position of the teeing area.

* * * * *